(12) United States Patent
Lin et al.

(10) Patent No.: US 8,683,743 B2
(45) Date of Patent: Apr. 1, 2014

(54) GRAIN GERMINATING SYSTEM

(75) Inventors: Chun-Mao Lin, New Taipei (TW);
Fu-Der Mai, Taoyuan County (TW);
Chien-Lung Hung, Taichung County
(TW); Chwen-Ming Shih, Taipei
County (TW)

(73) Assignee: Taipei Medical University, Taipei (TW)

( * ) Notice: Subject to any disclaimer, the term of this patent is extended or adjusted under 35 U.S.C. 154(b) by 1045 days.

(21) Appl. No.: 12/728,283

(22) Filed: Mar. 22, 2010

(65) Prior Publication Data

US 2011/0146148 A1 Jun. 23, 2011

(30) Foreign Application Priority Data

Dec. 18, 2009 (TW) .............................. 98143791 A

(51) Int. Cl.
*A01G 31/02* (2006.01)
(52) U.S. Cl.
USPC .................................. 47/61; 47/62 N; 34/90
(58) Field of Classification Search
USPC ........ 47/60, 61, 62 C, 62 N, 58.1 SE, 58.1 R;
165/201, 222, 233, 240, 247; 34/90, 34/104, 105
See application file for complete search history.

(56) References Cited

U.S. PATENT DOCUMENTS

| 2,498,573 | A | * | 2/1950 | Ozai-Durrani | 426/461 |
| 5,009,029 | A | * | 4/1991 | Wittlin | 47/62 C |
| 5,188,090 | A | * | 2/1993 | Griggs | 126/247 |
| 5,597,731 | A | * | 1/1997 | Young et al. | 435/284.1 |
| 6,363,656 | B1 | * | 4/2002 | Byun | 47/61 |
| 6,721,497 | B2 | * | 4/2004 | Gruzdev et al. | 392/485 |
| 2012/0066924 | A1 | * | 3/2012 | Ando et al. | 34/90 |

* cited by examiner

*Primary Examiner* — Rob Swiatek
*Assistant Examiner* — Lisa Tsang
(74) *Attorney, Agent, or Firm* — WPAT, P.C.; Anthony King; Kay Yang

(57) ABSTRACT

The present invention discloses a grain germinating system comprising a temperature controlling device, an incubation device, a drying device and a monitoring device. The temperature controlling device comprises a heat pump module, an air conditioning module and a piping module. The heat pump module can output a high or low temperature heat exchanging liquid. The temperature of a culture medium of a grain is adjusted by the incubation device. The incubated grain is dried by the drying device. The air conditioning module is for a plant building. The piping module is connected with the heat pump module, and is provided for the high or low temperature heat exchanging liquid to flow. The incubation device and the drying device are heated by the high temperature heat exchanging liquid. The drying device is cooled by the low temperature heat exchanging liquid provided for the air condition of the plant building to use.

22 Claims, 4 Drawing Sheets

GRAIN GERMINATING SYSTEM

BACKGROUND OF THE INVENTION

1. Field of the Invention

The present invention relates to a grain germinating system; in particular, it relates to a grain germinating system having features of power and water savings.

2. Description of Related Art

Recent studies have pointed out that the rice bran comprises many functional nutritional ingredients like inositol or water soluble cellulose etc., and also provides many functions, such as protection against hepatic steatosis, reduction in cholesterol, prevention of colonic cancer and so on. Among these ingredients, especially gamma-aminobutyric acid (GABA), which is a human inhibitory neuro-transmitter, can be used as a physiological activation ingredient that dominates more than 64% of inhibitory neuro-transmissions in the central nervous system and participates in physiological activities of the cerebral circulation as well. The major physiological functions thereof include: facilitating cerebrum blood circulations, increasing oxygen supplies to brain, promoting metabolisms in brain and providing sedative effect thereto. GABA can inhibit secretions of anti-diuretic hormone (ADH, which is also called vasopressin, and stored in posterior pituitary), and promote vasodilatation, further achieving the efficiency of decreasing blood pressure. Additionally, GABA is able to improve lipid metabolisms and symptoms caused by cerebral arterioscleroses clinically.

GABA-rich foods had been developed since 1986. At first, the GABA-rich tea was announced and commercialized. In 1994, GABA-rich rice germ foods were successfully developed by leading corps. In addition, meanwhile, germinated brown rice was accomplished firstly in the world and released to market in 1999.

At present, the manufacturing methods of GABA collected from rice, e.g., brown rice, in current international community are essentially the nitrogen-filled anaerobic fermentation method and the germinated brown rice method. The technology of nitrogen-filled anaerobic fermentation method is comparatively less up-to-date, such that in international community, the germinated brown rice method plays a role of main stream for technical development. The process of the germinated brown rice method comprises: paddy→cleaning→hulling→separation of brown rice and husks→high-quality brown rice→sterilization→washing→immersion in warm water→brown rice germination→washing→termination of activity→drying→final germinated brown rice product. The critical steps of the germinated brown rice method are the procedures of brown rice germination and drying. Usually the brown rice is immersed in water of suitable temperature for a certain duration time, allowing the germ thereof to germinate to a length of approximately 0.5~1.0 mm, and the germination is stopped before the brown rice starts to consume its own nutrition, such that the nutrition features and tastes of brown rice can be significantly improved.

Because of various factors needed to be closely noticed during the germination of brown rice, including seed activity, germination temperature, germination period of time, controls over microbes along the entire production process as well as accumulations of many indicative functional ingredients, it is therefore required to take automatic microbe monitoring and security into considerations particularly.

SUMMARY OF THE INVENTION

In view of the aforementioned drawbacks in prior art, the objective of the present invention is to provide a grain germinating system in order to resolve the issues in connection with unnecessary consumptions of electrical power and water in germination of grains, such as incubation of germinated rice and so forth.

According to the objective of the present invention, a grain germinating system is herein proposed for incubation of a grain. The grain germinating system according to the present invention comprises a temperature controlling device, an incubation device, a drying device, a culture medium controlling device and a monitoring device. The temperature controlling device comprises a heat pimp module, an air conditioning module and a piping module. The piping module is connected with the heat pump module, the air conditioning module and the drying module. The incubation device performs heat exchanges with the temperature controlling device, thereby adjusting a temperature of a culture medium in the incubation device. The drying device is also performs heat exchanges with the temperature controlling device to generate drying air so as to dry the incubated grain.

Herein, the grain germinating system further comprises a culture medium controlling device which is able to control the water quality of the culture medium by way of adding ozone or performing ultraviolet ray sterilization.

Herein, the grain germinating system further comprises a monitoring device which is used to monitor the water quality of the culture medium and control a total bacteria concentration in the culture medium to be approximately $10^3$ cfu/ml.

Herein, the temperature controlling device further comprises an air conditioning device adjusting a temperature of a plant building.

Herein, the heat pump module comprises a first liquid outlet, a first liquid inlet, a second liquid outlet and a second liquid inlet. The first liquid outlet outputs a high temperature heat exchanging liquid, the first liquid inlet recycles the used high temperature heat exchanging liquid, the second liquid outlet outputs a low temperature heat exchanging liquid, and the second liquid inlet recycles the used low temperature heat exchanging liquid.

Herein, the piping module comprises a plurality of piping units and a plurality of valve units.

Herein, the plurality of valve units are formed by a first valve unit, a second valve unit, a third valve unit and a fourth valve unit, and are applied to control a flow direction of the high temperature heat exchanging liquid or the low temperature heat exchanging liquid.

Herein, the incubation device comprises a motor driving unit and a heat exchanging piping unit. The motor driving unit drives flows of the process liquid passing through the heat exchanging piping unit for performance of heat exchanges with the high temperature heat exchanging liquid.

In summary of the descriptions set forth hereinbefore, the grain germinating system according to the present invention is able to control the temperature of the culture medium and the temperature of grain drying by means of operating the temperature controlling device, the incubation device, the drying device and the air conditioning device. Furthermore, since the temperature control is done by using the heat pump to draw out the heat, and underground water can be utilized as the cooling water in accordance with practical requirements. Therefore, the effects for saving electrical power and water can be successfully achieved.

DETAILED DESCRIPTION OF THE PREFERRED EMBODIMENTS

Figure 1:
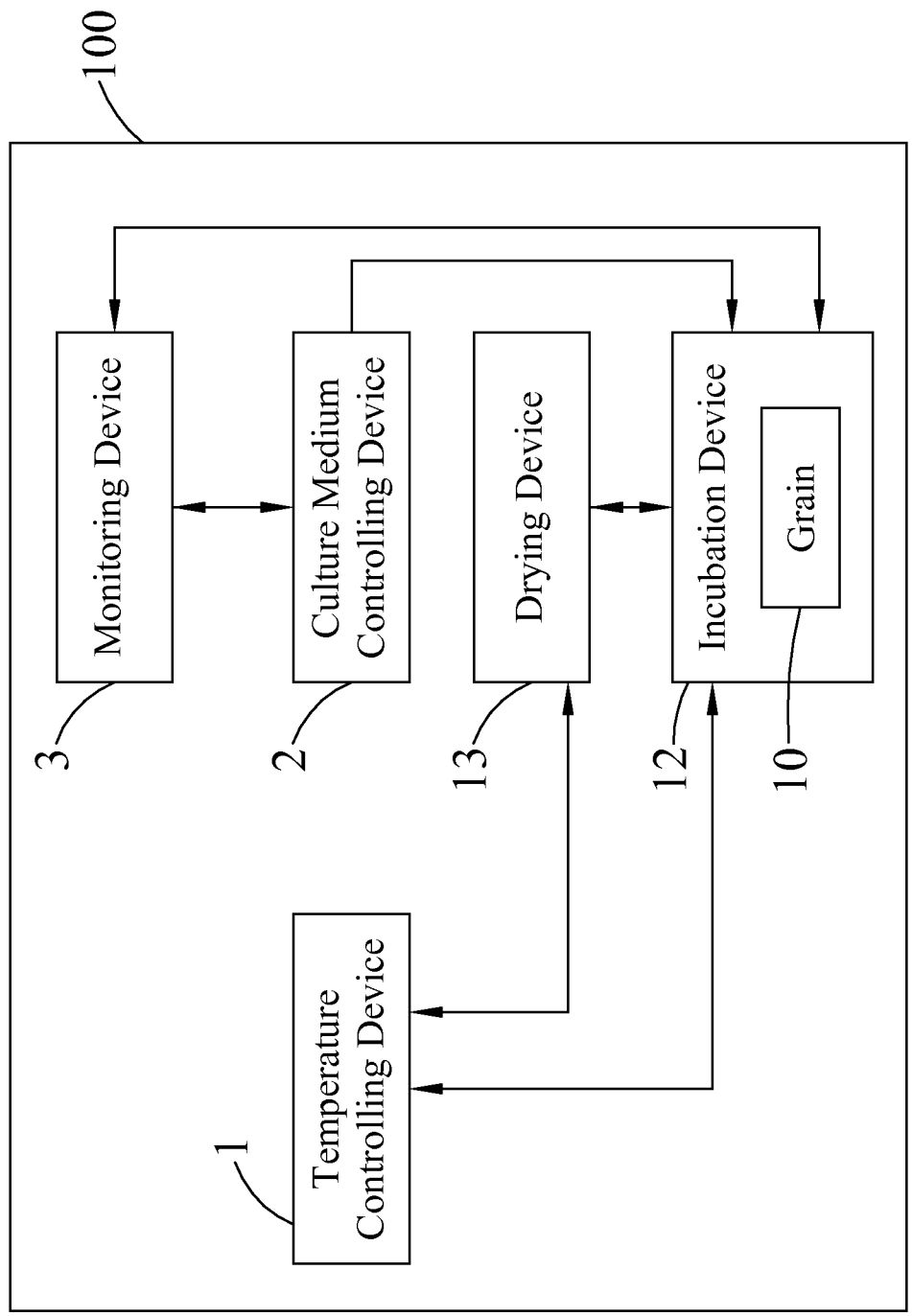
FIG. 1 is a block diagram of the grain germinating system according to the present invention.
Figure 2:
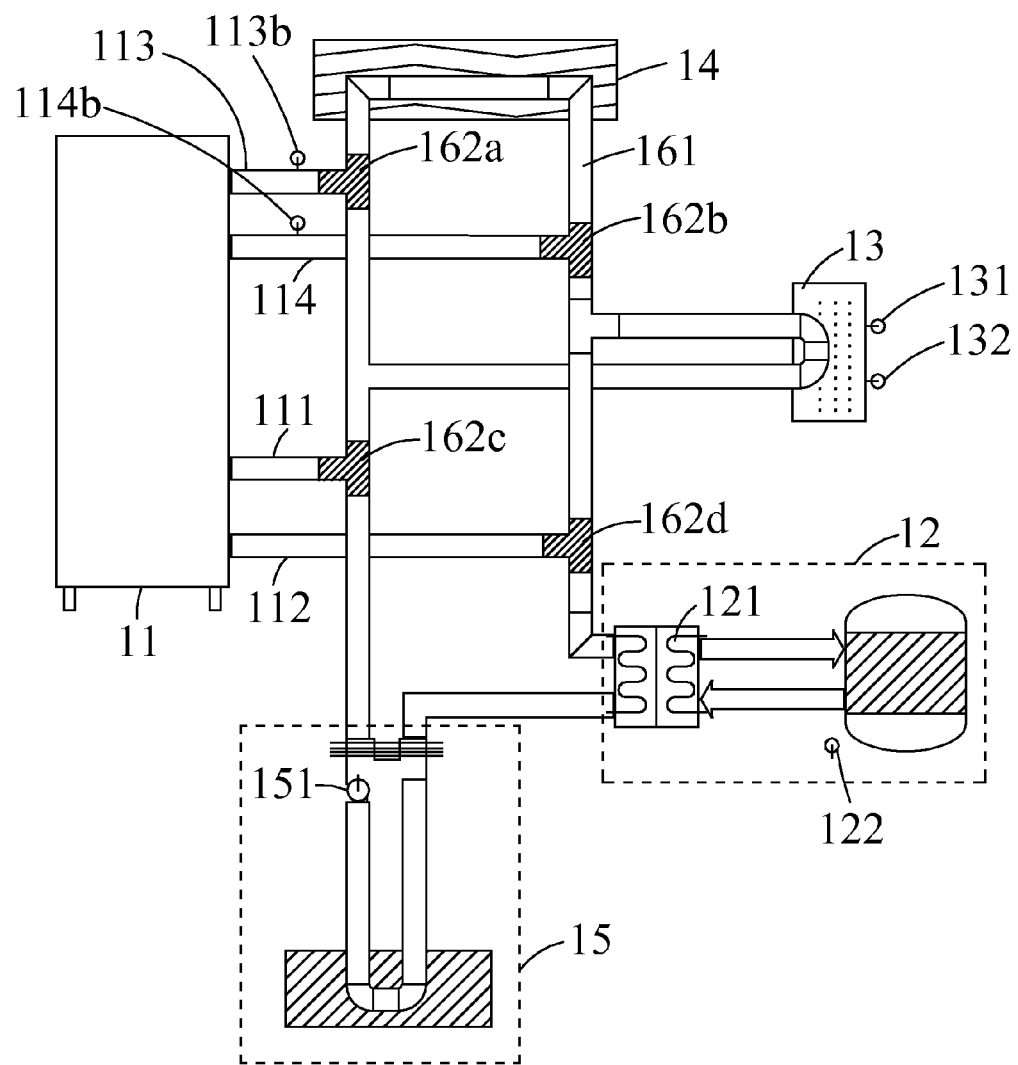
FIG. 2 is a diagram of controls over the temperature controlling device in the grain germinating system according to the present invention.

Refer initially to FIGS. 1 and 2, wherein a block diagram for the grain germinating system according to the present invention and a diagram of the temperature controlling device are shown, respectively. In the Figure, the grain germinating system 100 applicable for incubating a grain 10 comprises a temperature controlling device 1, a culture medium controlling device 2, a monitoring device 3, an incubation device 12 and a drying device 13. In the present embodiment, the grain may be implemented as brown rice, but by no means limited thereto, i.e., germ rice can be herein adopted as well.

The temperature controlling device 1 comprises a heat pump module 11, an air conditioning module 14, a heat dissipating module 15 and a piping module.

Figure 3:
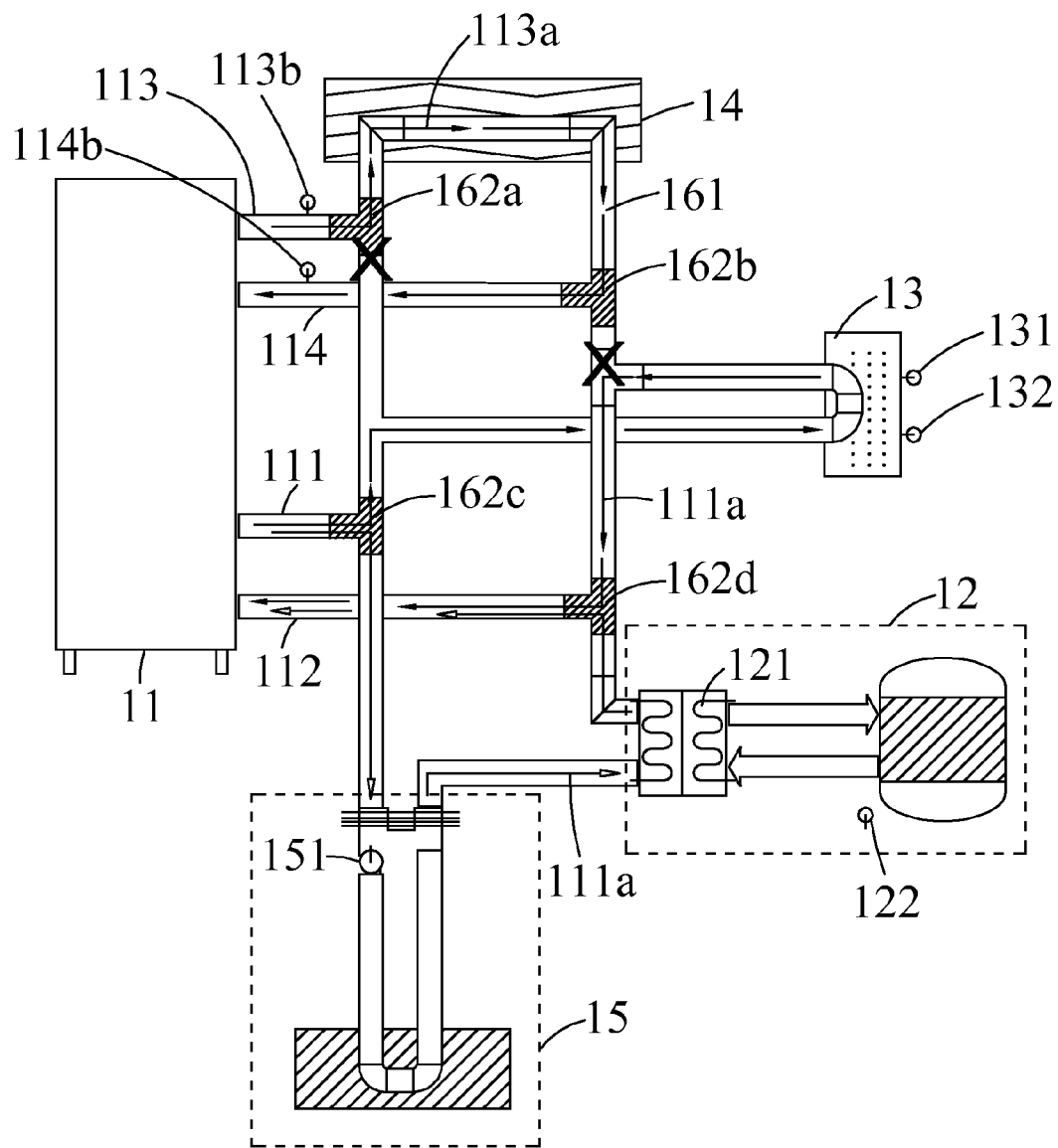
FIG. 3 is a diagram of cool water cycle in hot air drying by the grain germinating system according to the present invention.
Figure 4:
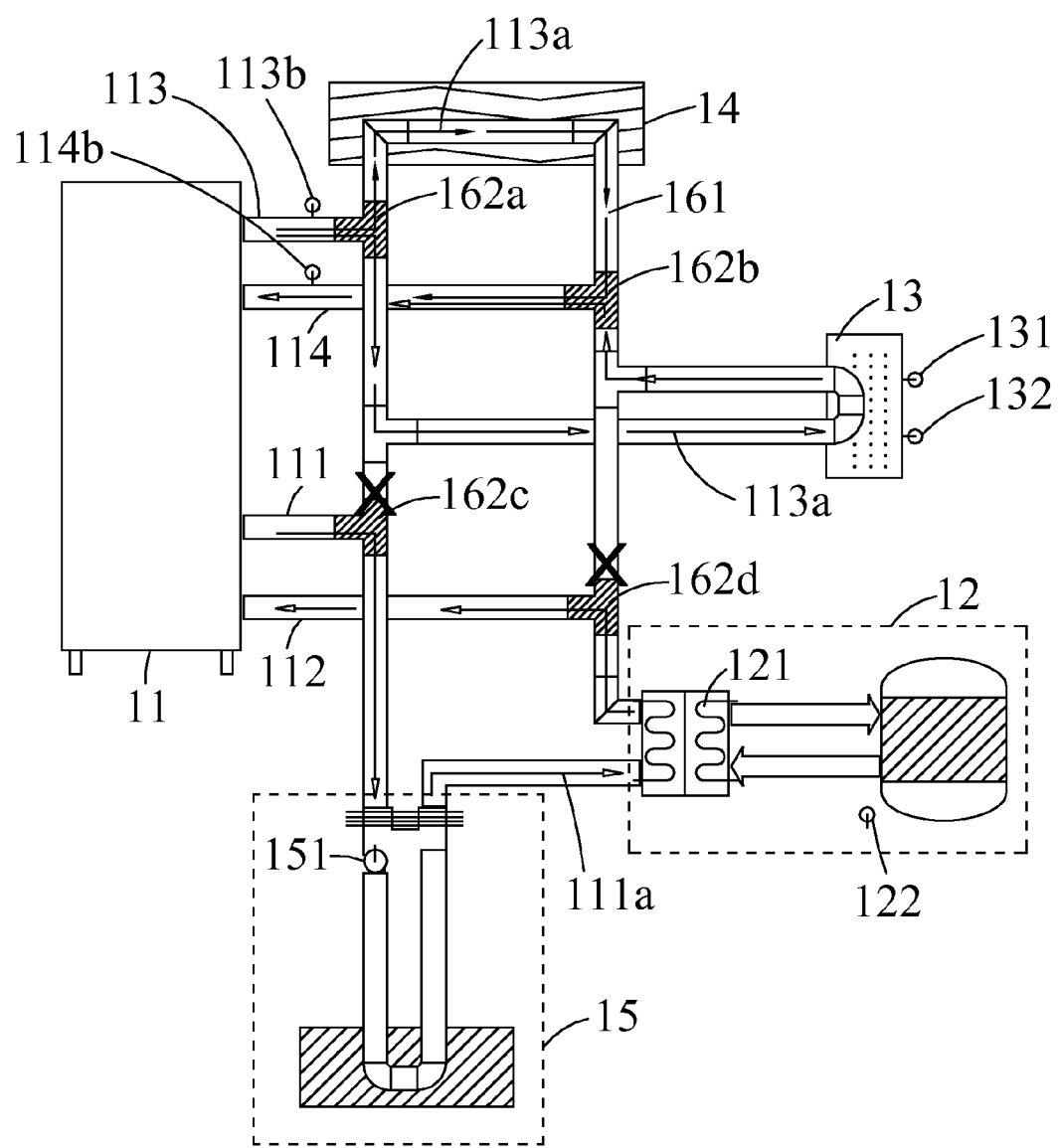
FIG. 4 is a diagram of cool water cycle in dry cool air and air conditioning control by the grain germinating system according to the present invention.

Refer next to FIGS. 3 and 4, wherein a diagram of cool water cycle with hot air drying and a diagram of cool water cycle with cool air drying and air conditioning control by the grain germinating system according to the present invention are shown, respectively. The heat pump module 11 can comprise an evaporator, a heat pump, a condenser and an expansion valve, allowing to repeatedly accomplish the heat cyclic processes of evaporation, compression, condensation, flow regulation and evaporation by means of heat exchanges. Herein the transfer of heat energy can be generated through the cyclic heat exchanges done in a compressor so as to expulse the heat energy at one end while absorbing the heat energy at the other end.

Herein, the heat pump module 11 further comprises a first liquid outlet 111, a first liquid inlet 112, a second liquid outlet 113 and a second liquid inlet 114. The heat energy absorbed by the heat pump module 11 can be passed by way of heat transfer so as to output the high temperature heat exchanging liquid 111a from the first liquid outlet 111, whose output temperature is approximately 65° C., but this is not restrictive and the output temperature can be modified based on actual process requirements. The first liquid inlet 112 is installed to recycle the used high temperature heat exchanging liquid 111a for reheating and cyclic usage. The second liquid outlet 113 can, through absorption of heat energy by the heat pump module 11, output a low temperature heat exchanging liquid 113a. The second liquid inlet 114 is installed to recycle the used low temperature heat exchanging liquid 113a for re-cooling and cyclic usage. The second liquid outlet 113 and the second liquid inlet 114 are respectively configured with a second temperature sensor 113b and a third temperature sensor 114b. The second temperature sensor 113b and the third temperature sensor 114b are able to determine the temperature of the low temperature heat exchanging liquid 113a flowing therein through. The heat pump module 11 is able to supply electrical energy or auxiliary solar energy to drive the operations of the compressor. The low temperature heat exchanging liquid 113a may be implemented as underground water of lower temperature in order to save water and energy.

The piping module includes a plurality of piping units 161 and a plurality of valve units. The piping unit 161 guides flows of the high temperature heat exchanging liquid 111a or the low temperature heat exchanging liquid 113a, and is connected with the heat pump module 11, the drying device 13, the air conditioning module 14, the incubation device 12 and the heat dissipating module 15. Therefore, the high temperature heat exchanging liquid 111a or the low temperature heat exchanging liquid 113a is transferred into the drying device 13, the air conditioning module 14 and the incubation device 12 for adjusting the temperature of the said modules/devices. Herein, the high temperature heat exchanging liquid 111a or the low temperature heat exchanging liquid 113a may be water or other liquid suitable for heat exchanges.

The plurality of valve units are formed by a first valve unit 162a, a second valve unit 162b, a third valve unit 162c and a fourth valve unit 162d. The first valve unit 162a is able to close or open the piping unit in order to control a flow direction of the high temperature heat exchanging liquid 111a or the low temperature heat exchanging liquid 113a passing through each piping unit 161. Thereby, the high temperature heat exchanging liquid 111a or the low temperature heat exchanging liquid 113a is adjusted to flow through the drying device 13, thus further modifying the temperature of the drying device 13.

The incubation device 12 can accommodate grains and the culture medium for incubation of the grain 100, such as brown rice, enabling whose germination to become the germinated rice. The incubation device 12 is also able to perform heat exchanges with the temperature controlling device 1 to adjust the temperature of the culture medium, i.e., the water for germination, of the grain. A motor driving unit (not shown in figures), a heat exchanging piping unit 121 and a first temperature sensor 122 are installed in the incubation device 12. The motor driving unit drives flows of the process liquid passing through the heat exchanging piping unit 121, so as to facilitate performance of heat exchanges with the high temperature heat exchanging liquid 111a flowing through the heat exchanging piping unit 121 to heat up the incubation device 12. The first temperature sensor 122 is responsible for determining the temperature of the incubation device 12.

The drying device 13 may be a drying box able to do heat exchanges with the temperature controlling device 1 in order to dry the incubated grain 10, thereby yielding the final germinated brown rice product. The drying device 13 is configured with a fourth temperature sensor 131, a fifth temperature sensor 132 and a conversion unit (not shown in figures). The fourth temperature sensor 131 is used to determine the temperature of the high temperature heat exchanging liquid 111a flowing through the drying device 13. The fifth temperature sensor 132 is used to determine the temperature of the low temperature heat exchanging liquid 113a flowing via the drying device 13. The conversion unit is able to convert heat energy stored in the high temperature heat exchanging liquid 111a transferred to the drying device 13 into dry air, such as dry hot air, usable for providing the drying process in dried germinated rice manufacture. Herein the temperature of the dry hot air may be maintained at approximately 45° C. by means of the fourth temperature sensor 131 thereby drying the grain 10 in a stable state.

The heat dissipating module 15 can be used for adjusting a temperature of the temperature controlling device 1, and may be configured with a heat dissipating motor 151 and cooling fins. When the incubation device 12 and the drying device 13 reach a predetermined temperature (the predetermined temperature is in a range of 42 and 48° C.), the heat dissipating motor 151 is started which transfers heat energy to outside thereby cooling the incubation device 12 and the drying device 13.

The culture medium controlling device 2 is able to control the quality of water in the culture medium by means of adding ozone or performing ultraviolet ray sterilization thereon, in which a concentration of the ozone may be kept at about 0.3 ppm.

The monitoring device 3 monitors the water quality in the culture medium and controls a total bacteria concentration in the water of the culture medium to be approximately $10^3$ cfu/ml in cooperation with the culture medium controlling device 2.

The temperature of the high temperature heat exchanging liquid 111a outputted by the first liquid outlet 111 may be up to 65° C. When the high temperature heat exchanging liquid 111a flows through the heat exchanging piping unit 121, heat energy is transferred to the incubation device 12, such that the temperature of the incubation device 12 progressively rises up. When the temperature of the incubation device 12 arises to a certain level, such that the temperature measured by the first temperature sensor 122 exceeds a predetermined temperature, the motor driving unit is controlled by the first temperature sensor 122 to stop operating. Therefore, the process liquid existing inside the heat exchanging piping unit 121 can be stopped flowing to cause the temperature to gradually descend. On the other hand, when the temperature of the incubation device 12 falls down to a certain level which makes the temperature measured by the first temperature sensor 122 become lower than a predetermined temperature, the first temperature sensor 122 at this moment controls the motor driving unit to start operations, such that the heat exchanging liquid existing inside the heat exchanging piping unit 121 continues to flow, thus increasing gradually in temperature thereof. Herein said predetermined temperatures may be in rage of 34° C. and 40° C. By means of the aforementioned control methods, it is possible to maintain the temperature of the incubation device 12 within a range of temperature, e.g., between 34° C. and 40° C. in order to keep the temperature to be constant.

Herein, in case that only the incubation device 12 needs to be heated, then the third valve unit 162c and the fourth valve unit 162d can be closed to form a smaller circulation in the high temperature heat exchanging liquid 111a flowing through the piping module 16, and the smaller circulation flows simply in and out of the heat exchanging piping unit 121 of the incubation device 12. When the temperature detected by the first temperature sensor 122 becomes higher than 37° C., it is possible to release extra heat energy to outside through startup of the heat dissipating motor 151 under the control of the first temperature sensor 122.

In case that simply the drying device 13 needs to be heated, the first temperature sensor 122 may send a control signal to control the motor driving unit not to operate, thereby preventing the incubation device 12 from being heated. When the first temperature sensor 122 is set within a range of 45° C. and 48° C., it is possible to control the third valve unit 162c and the fourth valve unit 162d to open. In addition, when the temperatures of both the incubation device 12 and the drying device 13 reach the predetermined temperature, the heat dissipating motor 151 will be started in order to expulse extra heat energy to outside.

The air conditioning module 14 is enabled to make the low temperature heat exchanging liquid therein flow through for adjusting the temperature of a plant building. Herein the air conditioning module 14 can be further installed with an ice storage bucket with a view to further reducing the temperature of the plant building.

In case that the grain 10 is brown rice, due to its relatively unique drying method, during long-time exposure to warm air drying at 45° C., it is not possible to dry out water contained in the inner layer of rice. Hence water balance may not be successfully reached which tends to result in overly fast dissipations of water at surface. Therefore, cracks in the rice kernel are undesirably exacerbated to cause poor quality and perspective in brown rice. Consequently, in the drying process, it is preferable to perform drying otherwise with cool air at some preset point of time respectively. In the present embodiment, such a predetermined point of time may be set to be at the sixth, the tenth or the sixteenth hour, with the temperature of the cool air assigned to be about 15° C., but not limited thereto, or else depending on specific requirements, it can be correspondingly set to other particular temperature. Upon the above-said point of time, the fifth temperature sensor 132 can send a control signal to control the first valve unit 162a, the second valve unit 162b, the third valve unit 162c and the fourth valve unit 162d to close, such that the low temperature heat exchanging liquid 113a is allowed to circulate through the drying device 13 in order to reduce the temperature of the drying device 13.

In summary, the grain germinating system according to the present invention, with the working characteristics of the heat pump, provides features e.g., heated incubation of brown rice, baked storage of germinated rice, cool drying of germinated rice and temperature regulation in plant building. The process liquid can be also recycled for reuse by way of the piping module, the production process can be therefore automatically controlled with precisions, and the effects for energy and water savings can be achieved as well.

Another advantage of the grain germinating system according to the present invention lies in that it is possible to supervise the quality of water in the culture medium by means of the culture medium controlling device and the monitoring device, thereby ensuring security of the product.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A grain germinating system for incubating a grain, comprising:
   a temperature controlling device, comprising:
      a piping module; and
      a heat pump module connected to the piping module, wherein the heat pump module comprises a first liquid outlet, a first liquid inlet, a second liquid outlet and a second liquid inlet, the first liquid outlet outputs a high temperature heat exchanging liquid, the first liquid inlet recycles the high temperature heat exchanging liquid, which is flowed through the piping module, the second liquid outlet outputs a low temperature heat exchanging liquid, and the second liquid inlet recycles the low temperature heat exchanging liquid, which is flowed through the piping module;
   an incubation device used to accommodate the grain and a culture medium, such that the grain germinates in the incubation device, the incubation device connected to the piping module in the temperature controlling device for heat exchanges so as to adjust a temperature of the incubation device; and
   a drying device connected to the piping module in the temperature controlling device for heat exchanges and generating drying air to dry a germinated grain, which is incubated in the incubation device.

2. The grain germinating system according to claim 1, wherein the temperature controlling device further comprises an air conditioning module regulating a temperature of a plant building.

3. The grain germinating system according to claim 1, further comprising a culture medium controlling device controlling water quality of the culture medium by means of adding ozone or performing ultraviolet ray sterilization.

4. The grain germinating system according to claim 3, wherein a concentration of the ozone in the culture medium controlling device is approximately 0.3 ppm.

5. The grain germinating system according to claim 3, further comprising a monitoring device monitoring the water quality of the culture medium so as to control a total bacteria concentration to be approximately 103 cfu/ml.

6. The grain germinating system according to claim 1, wherein the second liquid outlet comprises a temperature sensor.

7. The grain germinating system according to claim 1, wherein the second liquid inlet comprises a temperature sensor.

8. The grain germinating system according to claim 1, wherein a temperature of the high temperature heat exchanging liquid outputted by the first liquid outlet is 65° C.

9. The grain germinating system according to claim 1, wherein a temperature of the low temperature heat exchanging liquid outputted by the second liquid outlet is in a range of 0° C. to 15° C.

10. The grain germinating system according to claim 1, wherein the drying device comprises a conversion unit converting heat energy, which is stored in the high temperature heat exchanging liquid inputted to the drying device, into dry hot air.

11. The grain germinating system according to claim 1, wherein the drying device further comprises a temperature sensor used to determine a temperature of the high temperature heat exchanging liquid flowing through the drying device.

12. The grain germinating system according to claim 1, wherein the piping module comprises a plurality of piping units and a plurality of valve units used to open or close the plurality of piping units.

13. The grain germinating system according to claim 12, wherein the plurality of valve units are formed by a first valve unit, a second valve unit, a third valve unit and a fourth valve unit, and the first valve unit, the second valve unit, the third valve unit and the fourth valve unit are used to control a flow direction of the high temperature heat exchanging liquid or the low temperature heat exchanging liquid passing through the plurality of piping units.

14. The grain germinating system according to claim 13, wherein the drying device further comprises a temperature sensor used to determine a temperature of the low temperature heat exchanging liquid outputted from the second liquid outlet and flowing through the drying device.

15. The grain germinating system according to claim 14, wherein the temperature sensor is used to control the first valve unit, the second valve unit, the third valve unit and the fourth valve unit to close, such that the low temperature heat exchanging liquid flows into the drying device.

16. The grain germinating system according to claim 1, further comprising a heat dissipating module, which is connected to the piping module and adjusts a temperature of the temperature controlling device.

17. The grain germinating system according to claim 16, wherein the incubation device comprises a temperature sensor.

18. The grain germinating system according to claim 17, wherein the heat dissipating module comprises a heat dissipating motor, and when the incubation device and the drying device reach a predetermined temperature, the heat dissipating motor is started by the temperature sensor in order to cool the drying device.

19. The grain germinating system according to claim 18, wherein the predetermined temperature is in a range of 42° C. to 48° C.

20. The grain germinating system according to claim 17, wherein the incubation device comprises a motor driving unit and a heat exchanging piping unit, wherein the motor driving unit drives flows of a process liquid flowing in the heat exchanging piping unit, thereby performing heat exchanges with the high temperature heat exchanging liquid.

21. The grain germinating system according to claim 20, wherein the temperature sensor determines whether the temperature of the incubation device is a predetermined temperature, and if the temperature of the incubation device is higher than the predetermined temperature, the temperature sensor controls the motor driving unit to stop operating, such that the process liquid existing in the heat exchanging piping unit stops flowing thereby reducing the temperature of the incubation device; and if the temperature of the incubation device is lower than the predetermined temperature, the temperature sensor drives the motor unit to operate, such that the process liquid existing in the heat exchanging piping unit continues to flow thereby increasing the temperature of the incubation device.

22. The grain germinating system according to claim 21, wherein the predetermined temperature is in a range of 34° C. to 37° C.

* * * * *